(12) United States Patent
Mahrle et al.

(10) Patent No.: US 10,207,450 B2
(45) Date of Patent: Feb. 19, 2019

(54) PLASTICS CONNECTING SEAM, PLASTICS BOTTLE WITH A CONNECTING SEAM AND METHOD FOR THE PRODUCTION THEREOF

(71) Applicant: ISP TECHNOLOGY AG, Altstätten SG (CH)

(72) Inventors: Roger Mahrle, Oberuzwil (CH); Peter Reginald Clarke, Graffham (GB)

(73) Assignee: ISP TECHNOLOGY AG, Altstatten SG (CH)

( * ) Notice: Subject to any disclaimer, the term of this patent is extended or adjusted under 35 U.S.C. 154(b) by 0 days.

(21) Appl. No.: 14/903,015

(22) PCT Filed: Jul. 2, 2014

(86) PCT No.: PCT/CH2014/000094
§ 371 (c)(1),
(2) Date: Jan. 5, 2016

(87) PCT Pub. No.: WO2015/003279
PCT Pub. Date: Jan. 15, 2015

(65) Prior Publication Data
US 2016/0136867 A1    May 19, 2016

(30) Foreign Application Priority Data

Jul. 8, 2013 (EP) .................................. 13405081

(51) Int. Cl.
*B29C 49/48* (2006.01)
*B65D 5/42* (2006.01)
(Continued)

(52) U.S. Cl.
CPC ............ *B29C 49/482* (2013.01); *B29C 49/12* (2013.01); *B29C 49/4802* (2013.01); *B65D 1/02* (2013.01);
(Continued)

(58) Field of Classification Search
CPC ... B29C 49/482; B29C 49/12; B29C 49/4802; B29C 49/4817; B29C 49/50;
(Continued)

(56) References Cited

U.S. PATENT DOCUMENTS

| 744,972 A * | 11/1903 | Moomaw .................. F16L 9/02 138/168 |
| 2,043,694 A * | 6/1936 | Battles ...................... B65D 7/36 220/62.17 |

(Continued)

FOREIGN PATENT DOCUMENTS

| EP | 0 759 399 A1 | 2/1997 |
| EP | 0 805 012 A1 | 11/1997 |

(Continued)

OTHER PUBLICATIONS

International Preliminary Report on Patentability from corresponding International Patent Application No. PCT/CH2014/000094 dated Nov. 3, 2015.

(Continued)

*Primary Examiner* — J. Gregory Pickett
*Assistant Examiner* — Gideon Weinerth
(74) *Attorney, Agent, or Firm* — Alston & Bird LLP

(57) ABSTRACT

The invention relates to a plastics connecting seam for the fluid-tight connection of at least two plastics surfaces. The plastics connecting seam is in the form of a plastics connecting seam that supports strength under a load in such a way that a load acting in a standard load direction increases the connection strength of the seam.

12 Claims, 7 Drawing Sheets

(51) Int. Cl.
  *B29C 49/12* (2006.01)
  *F16B 11/00* (2006.01)
  *B65D 23/10* (2006.01)
  *B65D 1/02* (2006.01)
  *B29L 31/00* (2006.01)
  *B29L 31/46* (2006.01)
  *B29C 65/56* (2006.01)
  *B29C 65/08* (2006.01)
  *B29C 65/14* (2006.01)
  *B29C 65/48* (2006.01)
  *B29C 65/72* (2006.01)
  *B29C 65/74* (2006.01)
  *B29C 65/00* (2006.01)
  *B29C 65/02* (2006.01)
  *B29C 65/06* (2006.01)
  *B29B 11/08* (2006.01)
  *B29B 11/10* (2006.01)
  *B29C 49/04* (2006.01)
  *B29C 49/06* (2006.01)
  *B29C 49/42* (2006.01)
  *B29K 67/00* (2006.01)

(52) U.S. Cl.
  CPC ......... *B65D 1/0261* (2013.01); *B65D 5/4279* (2013.01); *B65D 23/102* (2013.01); *F16B 11/006* (2013.01); *B29B 11/08* (2013.01); *B29B 11/10* (2013.01); *B29B 2911/14486* (2013.01); *B29C 49/04* (2013.01); *B29C 49/06* (2013.01); *B29C 49/4273* (2013.01); *B29C 65/028* (2013.01); *B29C 65/06* (2013.01); *B29C 65/08* (2013.01); *B29C 65/1406* (2013.01); *B29C 65/1412* (2013.01); *B29C 65/48* (2013.01); *B29C 65/4835* (2013.01); *B29C 65/4845* (2013.01); *B29C 65/567* (2013.01); *B29C 65/568* (2013.01); *B29C 65/72* (2013.01); *B29C 65/7437* (2013.01); *B29C 65/7441* (2013.01); *B29C 66/1312* (2013.01); *B29C 66/54* (2013.01); *B29C 66/71* (2013.01); *B29C 2049/4807* (2013.01); *B29C 2049/4812* (2013.01); *B29C 2793/0018* (2013.01); *B29C 2793/0072* (2013.01); *B29K 2067/003* (2013.01); *B29L 2031/463* (2013.01); *B29L 2031/7158* (2013.01); *B29L 2031/7172* (2013.01); *B29L 2031/7282* (2013.01); *B29L 2031/737* (2013.01)

(58) Field of Classification Search
  CPC . B29C 49/04; B29C 49/4805; B29C 49/0047; B29C 2793/00; B29C 2049/4807; B29C 2049/4812; B29C 47/0023; B29C 66/234; B29C 66/24; B29C 66/242; B29C 66/2276; B29C 66/1122; B29C 49/0026; B29C 49/48; B29C 2049/021; B29C 2049/04882; B29C 2049/0009; B29C 2049/0063; B29C 47/0066; B29C 65/72; B29C 65/7441; B29B 11/14486; B29L 2031/463; B29L 2031/7158; B65D 1/02; B65D 1/0261; B65D 5/4279; B65D 23/102; B65D 1/00; B65D 1/40; B25F 5/02; B65B 3/022; Y10T 29/49908
  USPC ........ 220/678, 677, 689, 675; 264/529, 537, 264/538, 675, 413, 249; 425/525, 522, 425/524; 413/6
  See application file for complete search history.

(56) References Cited

U.S. PATENT DOCUMENTS

| | | | | |
|---|---|---|---|---|
| RE23,564 | E * | 10/1952 | Hobson | B29C 49/50 264/297.8 |
| 3,120,679 | A * | 2/1964 | Price | B29C 49/4802 215/398 |
| 3,151,767 | A * | 10/1964 | Nakata | B65D 7/36 138/164 |
| 3,268,344 | A * | 8/1966 | Kamm | B65D 7/38 220/62.13 |
| 3,297,225 | A * | 1/1967 | Bransten | B65D 7/38 220/678 |
| 3,366,290 | A * | 1/1968 | Mojonnier | B29C 49/4802 215/382 |
| 3,413,175 | A * | 11/1968 | Rochla | B29C 65/18 156/498 |
| 3,454,179 | A * | 7/1969 | Kerr | B29C 66/636 215/379 |
| 3,499,071 | A * | 3/1970 | Hurst | B29C 33/00 264/161 |
| 3,534,435 | A * | 10/1970 | John | B29C 43/361 264/529 |
| 3,535,411 | A * | 10/1970 | Hurst | B29C 49/4802 264/531 |
| 3,579,620 | A * | 5/1971 | Pettersson | B29C 49/4802 264/161 |
| 3,618,817 | A * | 11/1971 | Troughton | B21D 51/28 219/117.1 |
| 3,665,063 | A * | 5/1972 | Rupert | B29C 49/4817 264/529 |
| 3,692,453 | A * | 9/1972 | Quigg | B29C 49/4817 425/308 |
| 3,695,109 | A * | 10/1972 | Uhlig | B29C 49/72 425/306 |
| 3,795,162 | A * | 3/1974 | Jaeger | B29C 49/72 425/806 |
| 3,821,345 | A * | 6/1974 | Gilbert | B29C 49/14 264/161 |
| 3,872,202 | A * | 3/1975 | Lafosse | B29C 49/58 264/536 |
| 3,880,312 | A * | 4/1975 | Gilbert | B29C 49/14 215/399 |
| 3,892,513 | A * | 7/1975 | Mehnert | B29C 49/50 425/525 |
| 3,892,828 | A * | 7/1975 | Weatherly | B29C 47/065 264/161 |
| 3,944,642 | A * | 3/1976 | Uhlig | B29C 49/022 264/296 |
| 3,983,199 | A * | 9/1976 | Uhlig | B29C 49/18 264/161 |
| 4,003,492 | A * | 1/1977 | Beveridge | B21D 39/02 220/62 |
| 4,086,314 | A * | 4/1978 | Lampart | B29C 49/4247 264/526 |
| 4,089,283 | A * | 5/1978 | Mertens | B21D 51/30 220/378 |
| 4,123,217 | A * | 10/1978 | Fischer | B29C 49/4802 425/324.1 |
| 4,131,980 | A * | 1/1979 | Zinnbauer | B21D 39/02 220/4.14 |
| 4,199,129 | A * | 4/1980 | Fischer | B29C 49/48 249/157 |
| 4,361,246 | A * | 11/1982 | Nelson | B65D 7/36 220/619 |
| 4,392,295 | A * | 7/1983 | Sasai | B21D 51/32 220/620 |
| 4,457,465 | A * | 7/1984 | Shepard | B65D 15/06 220/620 |
| 4,502,607 | A * | 3/1985 | Szajna | B29C 49/4817 215/373 |
| 4,529,570 | A * | 7/1985 | Przytulla | B29C 49/4802 264/534 |
| 4,626,157 | A * | 12/1986 | Franek | B21D 51/32 413/1 |

(56) References Cited

U.S. PATENT DOCUMENTS

| | | | | |
|---|---|---|---|---|
| 4,697,972 | A * | 10/1987 | Le Bret | B21D 51/32 220/362 |
| 4,761,130 | A * | 8/1988 | Peters | B29C 49/04 264/531 |
| 4,816,093 | A | 3/1989 | Robbins, III | |
| 4,895,743 | A * | 1/1990 | Peters | B29C 49/04 206/436 |
| 4,948,356 | A * | 8/1990 | Dundas | B29C 49/4817 215/40 |
| 5,012,944 | A * | 5/1991 | Scheurenbrand | B29C 49/4817 220/677 |
| 5,022,544 | A * | 6/1991 | Dundas | B29C 49/4817 215/200 |
| 5,068,075 | A * | 11/1991 | Dundas | B29C 49/42 264/505 |
| 5,115,938 | A * | 5/1992 | Thompson | B21D 51/30 156/69 |
| 5,799,809 | A * | 9/1998 | Sako | B29C 49/42 215/12.1 |
| 5,846,578 | A * | 12/1998 | Cesano | B29C 49/0047 425/292 |
| 6,039,204 | A * | 3/2000 | Hosokoshiyama | B29C 49/4817 215/12.1 |
| 6,183,683 | B1 * | 2/2001 | Schwochert | B29C 49/4205 264/526 |
| 6,592,358 | B2 * | 7/2003 | Iwasaki | B29C 49/4802 264/531 |
| 7,150,624 | B1 * | 12/2006 | Maddox | B29C 66/4312 425/525 |
| 7,153,455 | B2 * | 12/2006 | Belcher | B29C 49/12 264/37.31 |
| 7,464,826 | B2 * | 12/2008 | Roubal | B65D 1/0276 215/373 |
| 7,563,403 | B2 * | 7/2009 | Nahill | B29C 49/4802 264/531 |
| 7,614,515 | B2 * | 11/2009 | Furusawa | B29B 11/14 215/12.1 |
| 8,539,664 | B2 * | 9/2013 | Tresse | B29C 66/43 264/249 |
| 8,540,928 | B2 * | 9/2013 | Etesse | B29C 49/4802 264/529 |
| 9,050,750 | B2 * | 6/2015 | Connolly | B29C 49/4802 |
| 9,555,573 | B2 * | 1/2017 | Gerlach | B29C 49/18 |
| 2002/0040908 | A1 * | 4/2002 | Hattori | B29C 49/22 220/678 |
| 2004/0108627 | A1 | 6/2004 | Schumann | |
| 2004/0245678 | A1 * | 12/2004 | Belcher | B29C 49/12 264/529 |
| 2005/0077645 | A1 * | 4/2005 | Skov | B29C 49/4802 264/154 |
| 2005/0163952 | A1 | 7/2005 | Beale | |
| 2006/0182841 | A1 * | 8/2006 | Rodriguez | B29C 49/4802 425/526 |
| 2007/0145646 | A1 * | 6/2007 | Cho | B29C 49/4802 264/529 |
| 2011/0064899 | A1 | 3/2011 | Thibodeau | |
| 2012/0266565 | A1 * | 10/2012 | Trude | B65D 23/102 53/453 |
| 2015/0239169 | A1 * | 8/2015 | Connolly | B29C 49/4802 264/534 |

FOREIGN PATENT DOCUMENTS

| | | |
|---|---|---|
| EP | 1 763 427 B1 | 1/2009 |
| EP | 1 853 416 B1 | 4/2009 |
| EP | 2 292 401 B1 | 12/2011 |
| EP | 2 103 413 B1 | 8/2012 |
| JP | S57 59725 A | 4/1982 |
| WO | WO 90/13490 A1 | 11/1990 |
| WO | WO 96/33063 A1 | 10/1996 |
| WO | WO 01/12515 A1 | 2/2001 |
| WO | WO 2005/042230 A1 | 5/2005 |

OTHER PUBLICATIONS

International Search Report and Written Opinion from corresponding International Patent Application No. PCT/CH2014/000094 dated Sep. 10, 2014.

European Search Report from corresponding European Patent Application No. 13405081.4 dated Nov. 25, 2013.

* cited by examiner

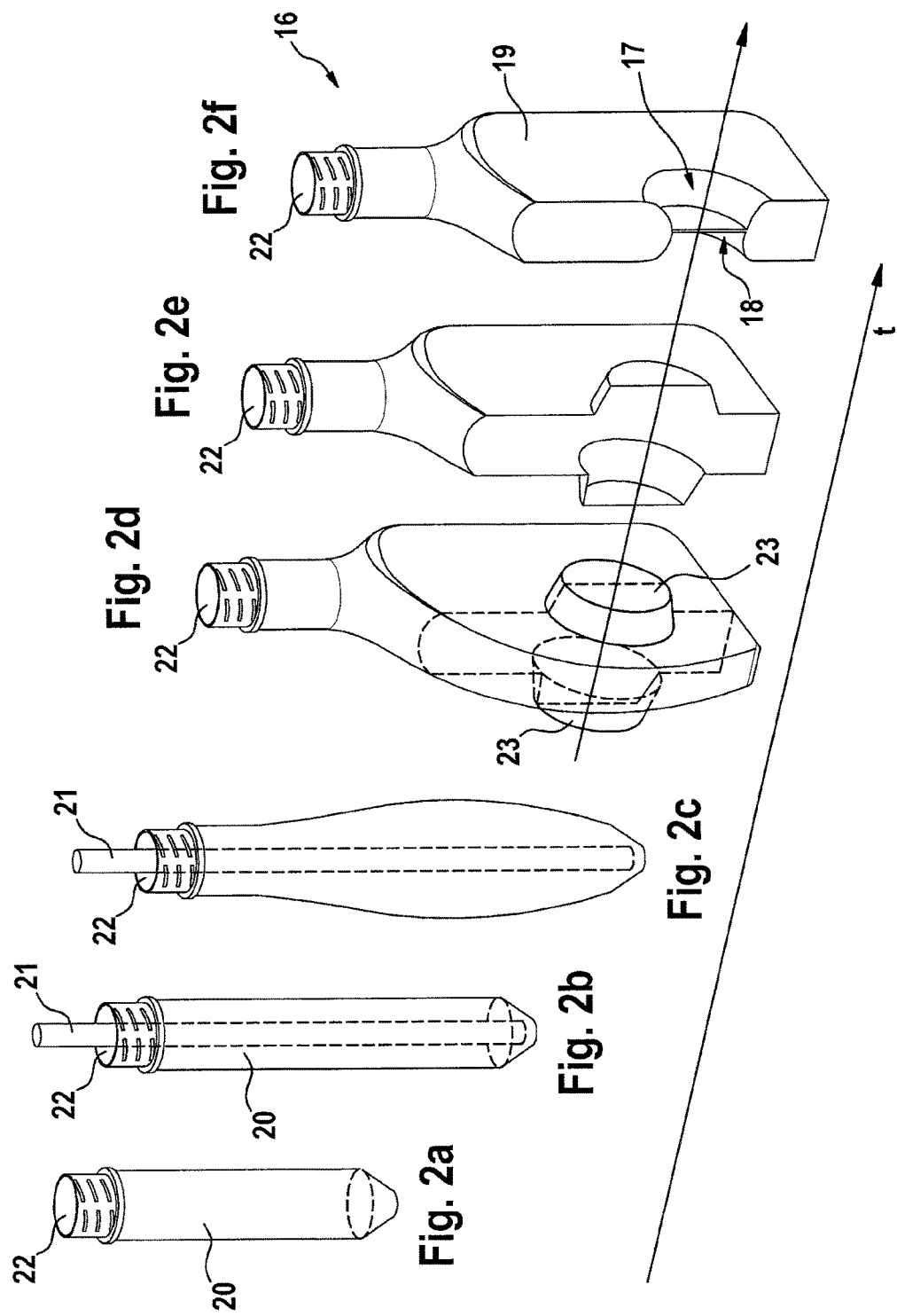

PLASTICS CONNECTING SEAM, PLASTICS BOTTLE WITH A CONNECTING SEAM AND METHOD FOR THE PRODUCTION THEREOF

CROSS REFERENCE TO RELATED APPLICATIONS

This application is a national stage entry of PCT/CH2014/000094 filed Jul. 2, 2014, which application claims priority to European Patent Application No. 13405081.4 filed Jul. 8, 2013, each of which is incorporated by reference herein in its entirety.

FIELD OF THE INVENTION

The invention relates to a plastics connecting seam for the fluid-tight, preferably for the gas-tight connection of at least two plastics workpiece areas, which are formed in a flat manner at least area by area. In addition, the invention relates to a plastics mold, in particular to a cavity device, specifically to a bottle device and/or to a canister device with at least one plastics connecting seam.

The invention furthermore relates to a method for producing a fluid-tight, preferably a gas-tight plastics connecting seam and/or for producing a plastics mold. Moreover, the invention relates to a tool device for producing a plastics connecting seam or a plastics mold, respectively, with a plastics connecting seam or to a tool device, respectively, for carrying out a method for producing a plastics connecting seam or for producing a plastics mold, respectively.

BACKGROUND OF THE INVENTION

The use of plastics is establishing itself increasingly, in particular also in a wide range of fields of daily life. One example of many for the use of plastics lies in the use of plastics for container-like objects, such as plastics bottles or plastics canisters, for example. Plastics bottles as well as plastics canisters are generally closable vessels, which have a comparatively large cavity for accommodating goods, such as in particular of liquids (wherein the liquids can also be comparatively viscous substances, such as honey, gels and materials of this type; it goes without saying that the goods, which are to be accommodated in the vessel, can preferably also be pourable solids, such as granulates or powder, in particular hygroscopic granulates or powder, for example). Generally, the differentiation between bottles on the one hand and canisters on the other hand is made on the basis of the volume thereof, but, in parts, additionally or alternatively also based on the shape thereof. In the case of volumes of more than approximately 5 to 10 l, one typically refers to canisters, whereas one rather tends to speak of bottles in the case of lower volumes. Moreover, hollow bodies, which are rather cuboid-shaped, are rather identified as canisters, whereas there is a tendency to identify rather cylindrical bodies as bottle. In practice, the separation between canister and bottle is oftentimes fluid.

While the use of plastics containers for chemicals (also household chemicals, such as detergents, cleaning agents and the like, for example) has already established itself for decades for the most part, the use of plastics containers has also established itself to an increased extent in recent years for the packaging of food, in particular also of liquids, such as beverages, for example, in particular carbonated beverages the like, wherein a pressure of up to approximately 10 bar can be created in the containers.

Regardless of the intended use, it is generally desired for plastics containers (but also other containers) of a certain size to be provided with a type of handle, so as to make it possible to more easily carry or to more easily handle, respectively, the vessel. Even though it is also quite possible to realize handles by using "blind holes" (the opening for the handle is thus not continuous, but still has a type of separating wall, which separates two opposite handle recesses), it is generally desired for the opening for the handle to be continuous ("open"). Generally, such a design is considered to be more advantageous from an esthetic point of view. Moreover, the practical value of the handle generally increases, because this makes it possible for right-handers as well as left-handers as well as persons with different hand sizes to grip more easily.

It is furthermore desired that no sharp-edged and/or protruding edges and seams are present, if possible, in particular in the area of the handle (in particular in areas, in which the palm or the fingers, respectively, of the user come to rest). Such edges and seams are at least uncomfortable in response to carrying, they might even represent a certain risk of injury.

In the case of such handles, it is furthermore desired for the handle to be completely embodied as cavity, if possible. A larger inner volume for accommodating liquids can be provided in this manner. It is in particular useful thereby, if the respective cavity area is open (thus "upwards" and "downwards") on both connecting points of the handle to the bottle body, so that, if possible, no "dead volume" remains under all conditions of use and tilt angles, in which residual amounts of liquid could collect.

Meanwhile, a further demand is for the respective object to be capable of being recycled in a particularly good and simple manner, if possible, after being used. This demand can in particular be fulfilled in that the respective object is made of a single material, if possible. However, in the case of so-called "multilayer blanks", which are made of a plurality of materials, a good recyclability can now also be realized as a result of a suitable selection of material combinations and interconnections of the different materials, which are used. Presumably, the demand for a good recyclability will become increasingly important in the coming years.

It goes without saying that it should be possible to produce as well as transport the respective vessels as quickly and cost-efficiently as possible. This is of particular importance for comparatively low-priced products, such as for beverages (in particular drinking water, mineral water, sodas and the like), for example, or for certain (household) chemicals (for example anti-freeze agents for motor vehicle windscreen cleaning systems).

While methods, which are quite practicable and cost-efficient, do exist now for some plastics materials for embodying handles, which fulfill at least a majority of the mentioned demands, it is still difficult in certain fields of applications, such as, for example, in the food sector. This is so, because the use of PET is particularly advantageous in certain fields of application (such as, for example, in the above-mentioned food sector), because this material combines different advantageous characteristics. For instance, PET is advantageous in the food sector, because it is tasteless, comparatively stable (thus also suitable for accommodating carbonated beverages, for example), as well as comparatively gas diffusion-tight (or the gas diffusion-tightness, which is already present in any event, can easily be increased further, respectively, by means of suitable methods; this is necessary, for example, so that the oxygen contained in the atmosphere cannot penetrate into the bottle and can change the taste of the food there or can cause the food stored therein to spoil, respectively, or also if hygroscopic materials, such as powder and the like, for example, are accommodated in the container, and if the penetration of water (vapor) is to be prevented). Furthermore, PET is also transparent, which is considered to be an advantageous characteristic, specifically in the food sector. Reference is to also be made (without any claim to completeness) to the packaging of (household) chemicals (for example of cleaning agents and the like), as well as of cosmetic products (for example of perfumes or bath additives), as further fields of application, in which the use of PET can be advantageous.

However, a large problem of the use of PET is that two PET parts cannot be connected to one another or can be connected in a barely sufficient stable manner, respectively, with reasonable effort, if certain optical demands are to be fulfilled. Even though it is possible, for example, for two PET areas to be placed on top of one another and to be connected to one another by means of ultrasonic welding; the weld seam created hereby with a width of typically 1 to 2 mm, is oftentimes not sufficiently mechanically stable and the eye can generally recognize it easily, in parts even as milky-white (and non-transparent) web. However, problems occur, if two PET areas are to be connected, wherein the "optical indistinguishability" or "transparency", respectively, of the material, is to be maintained in the area of the connection. The reason for this are the intrinsic characteristics of PET, because PET displays a strong tendency to crystallization (in part also identified as self-crystallization). In particular, a high crystallization tendency (typically in the minute range, partly also shorter) already results shortly above the glass transition temperature.

Methods for forming apertures or continuous handles, respectively, known in the prior art, in the case of which partial areas of the plastics container are initially deformed inwards, seals are formed subsequently and the "superfluous" wall areas created thereby are removed by means of die-cutting, cannot be used or can barely be used, respectively. This is so, because, in particular in the food sector or in the cosmetic/medical sector, the containers must be sufficiently tight with a very high degree of probability (so as to effectively prevent health risks as a result of contamination). Moreover, the containers are often treated comparatively roughly in the household sector (for example household chemicals, food, cosmetics), because they are brought along in bags or backpacks, for example, and/or because they can also fall to the ground from time to time. The plastics container must be able to absorb such loads, without resulting in leakiness thereof.

To solve the problem, partly improved PET mixtures, in the case of which seams can be connected to one another in an improved manner, have also been proposed. A use of such improved PET materials, however, still has not been able to establish itself, because the respective plastics materials are too expensive.

A further problem, specifically in the food sector (in particular in bottling plants), is the delivery of the bottles, which are still unfilled, to the bottling plant. A delivery (which is possible per se) of the completely formed bottles to the bottling plant, where they are filled, turns out to be highly uneconomical. This is so, because large volumes must be transported here with small weight, which leads to a correspondingly uneconomical transport (the same also applies for the storage of the bottles, which have not been filled yet).

Accordingly, it has established itself that so-called PET blanks (partly also identified as PETlings or as PET preforms) are delivered to the bottling plants. They have a compact shape. The PET blanks are made in separate plants, (generally) by means of injection molding processes and are delivered to the bottling plants as blanks. Here, they are deformed into the bottles, which are ready to be filled, by means of blow molding processes or stretch blow molding processes, respectively. Generally, the volume increases thereby by at least 10-times to 20-times. It can easily be understood, what transport effort or storage effort, respectively, can be saved hereby. Also for reasons of volume, it is desired for the handles to only be shaped or molded, respectively, at the bottling plant.

Accordingly, it should thus also be possible to maintain this type of logistics (delivery of PET blanks to the bottling plant, where they are blow molded or stretch blow molded, respectively, on site), when using PET bottles with handles. Moreover, it is particularly desirable that cost-efficient standard PET blanks, which are available in large quantities, can still be used.

Generally, methods or devices, respectively, which have been proposed so far, have at least one, but mostly several disadvantages in terms of the above description.

Publications EP 1 853 416 B1, EP 2 292 401 B1 as well as EP 103 413 B1 describe different production methods for stretch blow molded plastics containers, by means of which a container with a molded handle can be produced. An arrangement of two movable dies, which are located opposite one another, is thereby used in the stretch blow mold. These movable dies are moved towards one another (wherein it is additionally proposed in EP 2 103 413 B1 that they are initially moved away from one another prior to the movement, so that a type of bilaterally protruding fish eye forms; the wall thickness of the finished plastics mold is to become homogenous through this, if possible), so that two wall areas of the plastics container are connected to one another by applying pressure at a corresponding temperature (the dies are preferably heated). It is described as being generally advantageous for this purpose, if the molded handle is not continuous; thus if the walls, which are connected to one another, remain in the finished bottle (formation of handle recesses instead of a "real" handle). It is explained in part only as an option that a part of this "double wall", which is created, can be die-cut. This already shows that a sufficiently fluid-tightness cannot be realized in the area of the handle recess seams with the methods proposed therein, in particular if parts of the double wall are die-cut. A further disadvantage is the creation of mostly sharp edges, if the respective walls are stamped out. As a result of the sharp edges, which are created, it is at least uncomfortable to carry the resulting bottle (in particular if the filled bottle is relatively heavy; in the case of a 2 l bottle, a weight of more than 2 kg is to be expected). In part, this sharp edge, however, can also represent a risk of injury, which is obviously unwanted.

A different approach is chosen in publications US 2011/0064899 A1, WO 2005/042230 A1, US 2005/0163952 A1, US 2004/0108627 A1, WO 01/12515 A1, EP 0 805 012 A1 or WO 96/33063 A1. In the case of these methods, however, it is necessary to use a specific PET blank. The production of such a PET blank, however, is comparatively extensive. Moreover, the resulting increased volume of the blanks makes it more difficult to transport them. A further problem is that it is necessary to insert the PET blanks into the blow molding machine with a correct angular position. This also represents additional effort. Moreover, in the case of most of the methods or devices, respectively, described therein, it is not possible to realize a hollow handle, which has the corresponding disadvantages. The method described in WO 2005/042230 A1 or the device described therein, respectively, is by far the most advanced. It is possible with this method (using a specific blank) to produce a bottle with a hollow handle, which, according to a special embodiment, can also be connected to the bottle body in a fluid-tight manner at both connecting points. However, a disadvantage of the methods described therein is not only the requirement of a specific PET blank, but in particular also the highly complicated machine, which works for a correspondingly long period of time, which is expensive to buy and which is maintenance-intensive.

Finally, the European patent specification EP 1 763 427 B1 also describes a plastics container with molded handle part as well as a method for the production thereof. According to the method described therein, it is possible to be able to use a cylindrically formed standard PET blank for forming the bottle. A type of "stub handle" is thus formed. An obvious disadvantage of the bottle described therein or of the production method described therein, respectively, is that the handle is only connected to the bottle body on one side and is accordingly in fluidic connection with the bottle cavity only on one side as well. Many perceive the resulting bottle shape as being esthetically unsatisfactory. Moreover, the handle only has a limited stability. A further problem is that residual liquid quantities can remain in the bottle in response to the use of the bottle described therein, which is unwanted as well.

There is thus still a demand for a plastics connecting seam, which is improved as compared to plastics connecting seams known in the prior art, for a plastics mold, which is improved as compared to plastics molds known in the prior art, for a method for producing plastics connecting steams or plastics molds, respectively, which is improved as compared to methods for producing plastics connecting seams or plastics molds, respectively, known in the prior art, as well as for a tool device, which is improved as compared to tool devices known in the prior art, for producing plastics connecting seams, plastics molds or for carrying out methods, respectively, for producing plastics connecting seams or plastics molds, respectively.

SUMMARY OF VARIOUS EMBODIMENTS

The plastics connecting seam proposed herein, the plastics mold proposed herein, the method proposed herein as well as the tool device proposed herein solve the respective objects.

It is proposed to embody a plastics connecting seam for the fluid-tight, preferably for the gas-tight connection of at least two plastics workpiece areas, which are formed in a flat manner at least area by area, in such a way that the plastics connecting seam is embodied at least in sections as plastics connecting seam, which supports strength under a load in such a way that the connection strength thereof increases at least in response to a load acting in a standard load direction. Preferably, at least a part of the plastics connecting seam, which supports strength, is located in at least one of the plastics workpiece areas, which is formed in a flat manner. A fluid can in particular be understood to be a liquid comprising a substantially arbitrary viscosity, specifically a watery liquid or water, respectively. On principle, the fluid can also be an arbitrary type of fluid/liquid, such as, for example, chemicals, cleaning agents or also food (juices, sodas, water, milk, milk shakes, honey) and the like. Preferably, however, the connection is not only embodied in a fluid-tight, but also in a gas-tight manner. The escape of gases (such as, for example, the escape of carbon dioxide from carbon dioxide-containing beverages) can thus be prevented on the one hand, the penetration of gases can be prevented on the other hand (in particular of atmospheric oxygen, which could lead to an oxidation, a flavor-corruption and/or to a spoiling of food or also of moisture, which could lead to a change of the respective substance, for example by clumping of a powder, in the case of hygroscopic substances; in the latter case, one could think of an instant beverage power or the like, for example). A "tightness" (in particular a "gas tightness") can in particular be understood as a tightness, which is adapted to the respective intended purpose. For example, a gas diffusion can never be prevented (completely) by means of plastics material. Accordingly, it is also completely sufficient, if the plastics connecting seam has a tightness, which corresponds approximately to the tightness of the plastics material itself. Moreover, a gas tightness as compared to certain gases is also irrelevant or not required, respectively. In the latter case, reference shall be made to a helium tightness or a hydrogen tightness merely as an example. For example a helium-tightness is often irrelevant in connection with food, because helium is inert. Moreover, helium is generally too expensive to be used as protective gas for the formation of a protective gas atmosphere (typically, nitrogen is used here; accordingly, the plastics material and/or the plastics connecting seam are to be nitrogen-tight). Hydrogen, in turn (as does helium for that matter) also does not occur in food in relevant portions and only small quantities thereof are contained in the natural atmosphere as well. The plastics workpiece areas, which are to be connected to one another, can be areas, which are (initially) independent from one another, of different workpieces (for example joining two or more parts to a total workpiece, such as, for example, joining two half shells to form a vessel) or also different (end) areas of the same workpiece (for example cylindrical joining of a plate to form a vessel or formation of inner openings, such as in particular for embodying handles made of a standard PET blank by means of a blow molding process or stretch blow molding process, respectively). Plastics are to in particular be understood as arbitrary polymers, such as, merely as examples, PET (polyethylene terephthalate) polyolefins, PS (polystyrenes), PVD (polyvinylchloride), PLA (polylactides), PP (polypropylene) and the like. A connecting seam can be understood as a generally arbitrary connection with and/or without using additional connecting means (adhesives) or adhesion promoters and the like, respectively. In this context, (partial) fusing processes, welding processes, ultrasonic welding processes, (hot) adhering process and the like (if applicable also a combination of two or more processes), are to be understood merely as an example. The standard load direction of the plastics connecting seam is measured according to the respective intended use. Generally, the standard load is a load under tension (or with at least one vector component, respectively, which acts in the direction of tension). As a result of the specific embodiment of the plastics connecting seam as proposed herein, this load, however, in contrast to a standard connecting seam (as for example a butt seam, an overlapping connection and the like), does not lead to a load of a firm bond (welding process), for example, or of an adhesive material in the area of the seam, but, quite in contrast, leads to a (mechanical) stabilization of the connection. For example, this can be realized in that at least partial areas of the (surface of the) plastics connecting seam are pressed onto one another/are contracted by tensile forces in response to a load in standard load direction. This effect, which supports strength, does not need to extend (substantially) across the entire length of the plastics connecting seam. It can be quite sufficient for provision to be made, for example at regular intervals, for a seam section, which supports strength, while provision is made therebetween for (normal) connecting seams according to the prior art. However, it is preferred, if portions of the plastics connecting seam, which are as large as possible, are formed so as to support strength, because the stability and tightness of the connecting seam can be increased through this. Generally, the proposed embodiment of the plastics connecting seam requires a certain inherent stability or stiffness, respectively, of the respective area of the plastics workpiece area. However, this is more often the case in the case of standard plastics materials (and is in particular the case in the case of PET). In particular, it is important to point out that, if the plastics connecting seam must absorb higher forces, the plastics workpiece areas must also have a corresponding thickness, so as to be able to withstand the corresponding load (for example wall thickness of a plastics bottle or of a plastics canister, respectively). For the sake of completeness, it is important to mention that, for the most part, the proposed plastics connecting seam has similar strength characteristics as common plastics connecting seams in response to a load in the non-standard direction. However, due to the fact that it is quite rare for a load to occur in non-standard direction and/or with a typically lower force effect, a certain "weaker embodiment" as compared to known plastics connecting seams can also be tolerated. Incidentally, it is also possible to provide the plastics connecting seam with a different standard load direction, for example so as to alternative and in sections, so that, in the end, an effect, which supports strength, can be realized in a plurality of directions (substantially to the point of all directions, which can be expected realistically). It is furthermore pointed out that the effect, "which supports stability", of the "plastics connecting seam, which supports stability" is generally associated with the fact that an effect, "which supports tightness", of the plastics connecting seam also occurs in response to a corresponding load. In addition or as an alternative to the term "which supports strength" or "plastics connecting seam, which supports strength", it should thus be possible to also use the term "which supports tightness" or "plastics connecting seam, which supports tightness", respectively.

It is proposed in particular for the plastics connecting seam, which supports strength, to be formed as engage-behind device of at least a plastics workpiece area, at least partially and/or at least area by area. (Incidentally, it should be possible to use this definition instead of and/or in addition to the above-mentioned definition for defining the underlying invention). An engage-behind device can be realized, for example, as a type of hook device (in particular also provided with a certain longitudinal extension), as U-shaped, V-shaped and/or "inward-rolling" bending of a plastics workpiece area (in particular of an edge area of the like), etc., with such an embodiment. The effect, which supports strength, can be formed in a particularly simple manner as well as in a manner, which can be realized easily from a procedural aspect.

Moreover, it is proposed to embody the plastics connecting seam in such a way that the connecting strength thereof increases in a plurality of load directions, and to in particular embody it in such a way that a plurality of plastics workpiece areas, in particular two plastics workpiece areas, have an engage-behind device, at least partially and/or at least area by area. The plastics connecting seam can be used particularly universally with such an embodiment. In particular "uncommon load directions" can also be covered by this (for example a compression (which occurs area by area) of a bottle area as a result of a transport in a bag and/or as a result of falling over or dropping of the bottle in the case of a plastics bottle). A corresponding use-friendliness can result through this. In this context, an engage-behind device has turned out to be particularly useful, in the case of which the engaging behind occurs across an angle of more than 180°, in particular more than 210°, 240°, 270°, 300°, 330° or 360°. Such an embodiment can in particular be realized by a type of "rolling", in particular a "rolling up" of the respective areas of the plastics connecting seam. It is important to point out that the embodiment of the plastics connecting seam as plastics connecting seam, which supports strength, often has the result that a certain displacement stability of the plastics connecting seam results as well, such as, in particular, a stability against lateral displacement. It is thus possible, for example, for the plastics connecting seam to have an increased compressive strength (for example in the form of a surface-to-surface contact).

It is advantageous, if the plastics connecting seam is formed in such a way that it is embodied as plastics connecting seam, which supports strength, along a larger length, in particular substantially along its total length. In such a case, a particularly high strength of the plastics connecting seam can be realized. At the same time, a particularly large, uniform appearance of the arrangement is also possible. Finally, it is also possible to be able to avoid sharp edges or protrusions, for example, by transitions between different seam areas. It can nonetheless be advantageous, if certain length portions of the plastics connecting seam are not embodied as plastics connecting seam, which supports strength. If applicable, this is advantageous in the area of folds, narrow curve radii, transitions between different workpiece areas and the like. Generally, it is useful, if at least 25%, 50%, 60%, 70%, 80%, 90%, 95%, 96%, 97%, 98% or 99% of the plastics connecting seam length are embodied as plastics connecting seam, which supports strength. The information can thereby relate to a total workpiece or to a "plastics connecting seam unit", respectively (for example to the plastics connecting seam, which is provided for embodying an aperture or a handle), whereas other plastics connecting seam areas "are left out", if applicable.

Moreover, it is proposed to provide at least one additional fluid sealing device, which is at least provided in sections, in the case of the plastics connecting seam. This can in particular be a firmly bonded seam, a weld seam, an adhesive seam and/or an adhesive seam, which can be hardened by active connection. The welding process can take place by means of ultrasonic welding process, friction welding process and the like, for example. An "adhesive seam, which can be hardened by active connection" can be understood as an adhesive, for example, which hardens (quickly) under the impact of (UV) light. If applicable, an adhesive, which is (substantially) hardened after being exposed to a (UV) flashlight impulse can even be envisioned. Incidentally, arbitrary adhesives can be used as adhesives, such as, in particular, one-component adhesives, adhesives which can be hardened by temperature (if applicable, an increased temperature of the plastics material turns out to be advantageous here in the course of a blow molding process or stretch blow molding process, respectively) or also a two-component adhesive. In this context, it is not only possible for an adhesive to be applied in the area of the plastics connecting seam, which supports strength, only after embodying the actual plastics connecting seam, which supports strength. In addition or in the alternative, it is possible for the adhesive application in the form of a coating of (parts) of at least one of the plastics workpiece areas, which are to be connected to one another, to take place prior to embodying the plastics connecting seam, which supports strength. An "initiation of the adhesive effect" or hardening of the adhesive, respectively, can occur after the formation of the plastics connecting seam, which supports strength, for example by means of UV radiation or also by the impact of heat and the like. It is important to point out that the fluid sealing device has the primary object of causing a sealing effect. In contrast, the mechanical strength of the plastics connecting seam (at least a larger portion of the strength of the plastics connecting seam) is realized by the formation of the plastics connecting seam as plastics connecting seam, which supports strength. This is why comparatively simple, cost-efficient and quickly hardenable materials can be used. It is also not disadvantageous, if they require a certain time until they harden completely. The fluid sealing device can in particular support or effect, respectively, a fluid-tightness and/or a gas-tightness.

It is furthermore proposed for the at least one additional fluid sealing device to be arranged asymmetrically, intermediately and/or on the edge side, at least area by area. The positional arrangement thereby refers in particular to the contact area of the plastics connecting seam. An application on the edge side (for example an application in the area of an edge) can take place particularly easily from a procedural aspect, because such an area can generally be accessed particularly easily. The term "on the edge side" (but also asymmetrically and intermediately) can thereby refer to different "reference systems", such as, in particular, to the finished plastics connecting seam, which supports strength (thus, for example, to a U-shaped profile or a rolled-up profile).

First tests have shown that it is advantageous, if at least one plastics workpiece area has a plastics material with a short crystallization half life and/or a PET material or is substantially made of such a plastics material, respectively, at least area by area. In such a case, the special characteristics of the proposed plastics connecting seam can prove to be particularly effective. It is important to point out in particular that, to date, it was not possible or barely possible, respectively, to realize plastics connecting seams with economically justifiable effort and/or sufficient stability and tightness characteristics with PET materials. In other words, the formation of mechanically stable and/or fluidically tight plastics connecting seams often becomes possible (in a useful way) when materials with a short crystallization half life are present or in the case of PET materials, respectively.

A plastics mold is furthermore proposed, which has at least one plastics connecting seam according to the preceding description. The plastics mold can then have the same characteristics and advantages (at least in analogy), as they have already been described in the context with the plastics connecting seam. A corresponding further development of the plastics mold is also possible (at least in analogy). The plastics mold can in particular be a cavity device and/or a vessel device, specifically a bottle device and/or a canister device. Such plastics molds are used in the industrial as well as in the domestic environment. In particular in the domestic environment, they are not only used for chemicals (for example cleaning agents), but often also for food (water, sodas and other beverages, if applicable also solid bodies, such as flour, rice, breakfast cereals, powder (in particular beverage powder, such as, for example, instant beverage powder, instant tea, instant hot chocolate) etc.) as well as for cosmetic products (for example perfumes, shampoo, bath additives) or for medical products, respectively.

It is advantageous, if the plastics mold is a blow molded plastics body, at least partially and/or at least area by area. "Blow molded" also includes further developments of the blow molding process, such as, in particular, the stretch blow molding, extrusion blow molding and stretch extrusion blow molding. This represents the standard production method for such plastics molds. A corresponding embodiment can thus greatly increase the acceptance of the instant invention. It is possible, in particular, for parts of the production chain to be exchanged in the form of a "drop-in solution", without having to adapt other parts of the production chain.

In this context, it is in particular useful, if the plastics mold is made of a preferably injection molded and/or extruded blank, in particular of a standard blank. The acceptance of the plastics mold can be increased again through this. A "cast blank" refers in particular to an injection molded blank.

It is proposed in particular for the plastics mold to have at least one aperture device, which serves in particular for embodying a preferably hollow handle device. The plastics mold can be handled better by means of such a handle device. This can facilitate the use as well as the transport of the (filled) plastics mold. This can be advantageous, in particular in the case of larger volumes (for example starting at approx. 2 l or 2 kg, respectively). If the handle device is embodied so as to be hollow, this area of the plastics mold can also serve to accommodate filling material, such as liquids, for example. Volume (storage space, transport volume) can be saved through this. Such an embodiment is furthermore often particularly advantageous from an esthetic point of view. However, apertures can also be provided for other purposes, such as, for example, also for design purposes, so as to provide for a particularly memorable design of the plastics mold. An improved fastening of the plastics mold (for example an insertion into rods or the like) can also be envisioned.

A method for producing a fluid-tight, preferably a gas-tight plastics connecting seam of the above-described type and/or for producing a plastics mold of the above-described type is furthermore proposed, which comprises the following steps:

arranging at least two plastics workpiece areas, which are to be connected to one another, adjacent to one another and deforming at least one partial area of at least one plastics workpiece area in such a way that a plastics connecting seam, which supports strength, results at least area by area. The characteristics and advantages already described above can also follow in this context at least in an analogous manner. A further development of the method in terms of the preceding description is also possible, at least in analogy. For example, the arrangement of the plastics workpiece areas, which are to be connected to one another, can also take place by placing them on top of one another, by end-to-end arrangement (preferably with a certain overlapping area), in a frontal arrangement with at least one bent or folded end fold area or the like, respectively. For logical reasons, the size of an overlap area, which might be present, is thereby chosen in such a way that the respective overlap area is used largely or substantially completely, respectively, for embodying the plastics connecting seam, which supports strength, and that an overlap does not occur any longer outside of this area (or that a plastics material is no longer present in these areas, respectively), in the case of at least one of the plastics workpiece areas. In such a case, the plastics material can be used optimally, without being accompanied by unnecessary material use.

It can turn out to be useful, in particular, if at least two plastics workpiece areas, which are to be connected to one another, are arranged so as to at least partially lie on top of one another and/or that the edges on the edge side thereof are at least substantially oriented towards one another, at least area by area, in the case of the proposed method. Carrying out the method in such a way can be handled in a particularly simple procedural manner. Accordingly, the tool, which is used to carry out such a method, can also be embodied in a comparatively simple manner. The orientation of the two plastics workpiece areas, which are to be connected to one another, relative to one another or with regard to their edges on the edge side thereof relative to one another, respectively, can be realized by a corresponding positioning of the respective areas relative to one another. However, an initial "rough orientation" is possible, wherein a "fine orientation" of the respective parts relative to one another is realized subsequently, for example by means of a cutting process, trimming process, die-cutting process or the like.

It is in particular possible to carry out the method in such a way that at least two plastics workpiece areas for embodying at least one plastics connecting seam, which supports strength, are deformed, at least area by area. On the one hand, the stability of the respective plastics connecting seam can generally be increased by means of the deformation of two plastics workpiece areas and/or the effect, which supports strength, of the plastics connecting seam can be realized for a plurality of directions. However, it might likewise also be the case that the deformation process can be designed in a particularly simple manner by means of such an embodiment (and that the used tool can accordingly be designed in a correspondingly simple manner). It is in particular possible for the respective plastics workpiece areas "to be placed on top of one another in two layers" and to subsequently be deformed as unit, such as, for example, folded, rolled or bent over.

It is furthermore proposed to carry out the method in such a way that at least one plastics workpiece area is deformed by means of a deformation process by at least partially using a blow molding process and/or a deformation process by changing at least partial areas of at least one tool device. Such a method has proven to be particularly useful from a procedural aspect and its principle is known in the prior art. For example, it is in particular possible to use mechanically movable dies, as they are described in EP 2 103 413 B1, EP 2 292 401 B1 or EP 1 853 416 B1.

In particular, the method can be carried out in such a way that at least one plastics workpiece area is subjected to a trimming process. This trimming process can be carried out prior to embodying a plastics connecting seam, which supports strength (which is preferred), so as to eliminate material protrusions, which are unnecessary and which might even be hindering for the subsequent deformation processes, but also only after embodying a plastics connecting seam, which supports strength (for example for die-cutting a formed partition wall), so as to thus realize an aperture in the vessel body (or other workpiece bodies).

Finally, a tool device for producing a plastics connecting seam of the afore-described type and/or for producing a plastics mold of the afore-described type and/or for carrying out a method of the afore-described type is proposed, which has at least one plastics workpiece area bending device. By means of such a plastics workpiece area bending device, it is possible in a simple manner to realize a plastics connecting seam, which supports strength, which is in particular formed as engage-behind device. The plastics workpiece area bending device can be realized, for example, as a type of "U-shaped groove" (with rounded bottom), which is located parallel to the flat surface of the plastics workpiece areas, which are to be connected to one another, and/or parallel to the edge direction of the plastics workpiece areas, which are to be connected to one another. The movement can be carried out in the form of a transversally displaceable die, for example. The latter can be part of a (cavity) shape, which is otherwise in particular immovable. It is advantageous, if the tool device, in particular at least parts thereof, such as in particular the plastics workpiece area bending device, are heated, so as to thus leave the plastics material in an optimal temperature range (in particular, an increased stiffness can be avoided effectively by means of cool-down processes).

It is in particular possible to arrange the at least one plastics workpiece area bending device in a movable manner, in particular so as to be movable relative to other partial areas of the tool device. A deformation process of the parts, which are to be deformed, can be realized through this in a particularly simple way, without having to necessarily influence other parts of the workpiece, which is to be made. In particular, the respective part of the tool device can also realize additional objects (such as a cutting process, for example). The respective parts of the tool device can in particular be formed as a type of movable dies or the like.

It is advantageous in particular, if provision is made in the case of the tool device for a trimming device, which is preferably formed integrally with at least one plastics workpiece area bending device. The respective plastics workpiece areas, which are to be connected to one another, can thus be prepared in a particularly advantageous manner, before they are connected to one another. Generally, the strength and/or tightness of the resulting plastics connecting seam can hereby be particularly high. It can in particular be made possible to largely minimize possible waste.

It is finally proposed to provide the tool device with at least one adhesive application device. With the help of the adhesive, the strength of the resulting plastics connecting seam can be increased on the one hand, but the tightness (in particular fluid-tightness and/or gas-tightness) of the respective plastics connecting seam can also be increased additionally or in the alternative on the other hand. This is advantageous for many fields of application, if not even (substantially) indispensable. The adhesive can thereby be applied prior to positioning the respective plastics workpiece areas relative to one another, during a "preparation" of the respective surface areas, which are to be connected to one another, for embodying a plastics connecting seam or after embodying the plastics connecting seam, which supports strength, respectively.

BRIEF DESCRIPTION OF THE SEVERAL VIEWS OF THE DRAWINGS

Further details of the invention and in particular exemplary embodiments of the proposed device and of the proposed method will be explained below by means of the enclosed drawings.

FIGS. 2a-2f show a possible method for embodying handle recesses for a PET bottle of a PET blank by means of a stretch blow molding process, visualized by successive, schematic, perspective views;

DETAILED DESCRIPTION

FIGS. 1a-1h illustrate different embodiments of self-strengthening plastics connecting seams 1a, 1b, 2c, 1d, 1e, 1f, 1g, 1h, (plastics connecting seams, which support strength), in each case in a schematic cross section.

The schematic drawings of FIGS. 1a-1h are to primarily explain the mechanical stability of the plastics connecting seams. In other words, it pertains to the characteristic, which support strength/which self-strengthen, of the plastics connecting seams in response to a load in different directions. To clarify the facts, a gap is thus drawn between the two plastics plates 2, 3 of the respective plastics connecting seam. It goes without saying that this would result in the fact that the respective plastics connecting seam would generally not be liquid-tight, fluid-tight and/or gas-tight. In reality, however, the surface areas of the two plastics plates 2, 3, which are located on top of one another, are deeply surface-pressed to one another to a certain extent. This leads to an (initial) liquid tightness, fluid tightness or gas tightness, respectively (aside from a certain waste, which can never be avoided completely). The respective tightness can incidentally also be increased by additional sealing materials 15 (illustrated in FIG. 1g), which will be explained in more detail below.

Figure 1A:
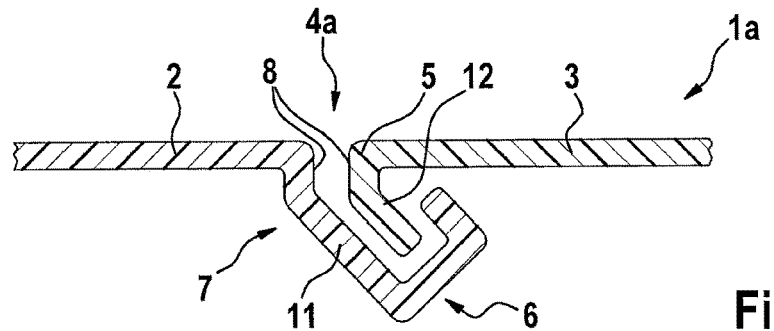
FIGS. 1a-1h show different embodiments of a self-strengthening plastics connecting seam, in each case in a schematic cross section.

FIG. 1a illustrates a first possible exemplary embodiment of a plastics connecting seam 1a. In the case of the plastics connecting seam 1a, two plastics plates 2, 3 are connected to one another in a seam area 4a. In the case of the exemplary embodiment according to FIG. 1a, the plastics plate 3 on the right-hand side in the drawing is provided with a hook-like fold 5. The end area of the left plastics plate 2 in the figure also has a fold 7, the end of which, however, is provided with a bend 6, which is designed in a U-shaped manner and which encompasses as well as engages behind the hook-like fold 5 of the right plastics plate 3.

As can easily be seen in FIG. 1a, the plastics connecting seam 1a can be loaded under tension as well as under pressure to a certain extent, without the need for the two plastics plates 2, 3 to be (fixedly) adhered to one another. This is so, because the front sides 8 of the plastics plates 2, 3 abut in response to a load in pressure direction and prevent a further movement. The size of the loadability under pressure thereby depends in particular on the size of the front sides 8, as well as on the thickness of the plastics plates 2, 3. If, for example, the front sides 8 are embodied so as to be comparatively small, a pressure load, which is not excessively large, can already result in a "lateral slipping" of the two front sides 8 against one another. This applies in particular, because, in reality, the "bending areas" of the respective walls have certain "rounding areas". If, in contrast, the plastics plates 2, 3 are pulled apart in tensile direction, the combination of U-shaped engage-behind area 6 and hook-like fold 5 leads to a locking of the two plastics plates 2, 3 in such a way that a further tensile movement is prevented.

Incidentally, the term "plastics plate" is to be interpreted broadly. The use of the term "plate" is to clarify that it is an element, which has a comparatively large surface extension and, in contrast, a relatively small thickness. The use of the term "plate" (in contrast to a "foil", for example) is to moreover point out that the respective plastics plates 2, 3 must have a certain inherent stiffness and/or strength (in particular also a strength in response to a pressure load). The respective stiffness/strength thereby depends on the respective intended use.

Figure 1B:
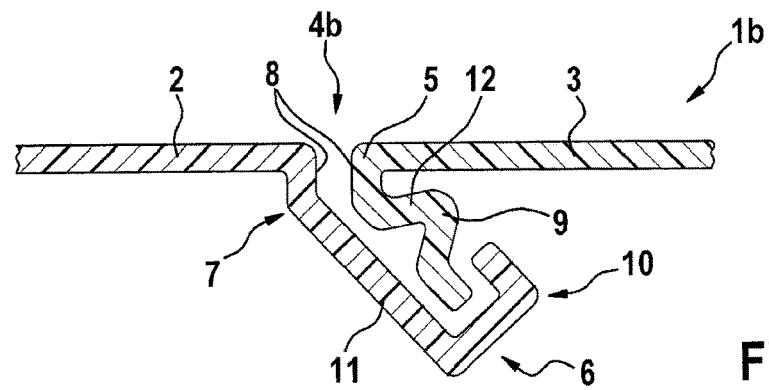

FIG. 1b illustrates a further possible exemplary embodiment for a plastics connecting seam 1b. The plastics connecting seam 1b at hand is largely similar to the plastics connecting seam 1a illustrated in FIG. 1a and includes a seam area 4b. Contrary thereto, however, a pleat 9, which runs in longitudinal direction, can additionally be seen in the area of the fold 5 in the case of the plastics plate 3, which is located on the right in the Figure. The pleat 9 can thereby realize a plurality of characteristics, which are generally advantageous. On the one hand, it is possible hereby that a certain "elastic spring effect" can be realized in response to a load under tension (but also under pressure). This can prove to be particularly advantageous, because it is thus possible, for example, that the direct welding of the two plastics plates 2, 3 in a top area 10 of the plastics connecting seam 1b does not need to (completely) absorb possible loads, which act for a short period of time. Such loads, which act for a short period of time, can be created, for example, if the bottle is dropped or is placed roughly onto a shelf, respectively. Generally, the "spring effect" by means of the pleat 9 is particularly advantageous, because the direct connection between the plastics plates 2, 3 is generally comparatively brittle. It goes without saying that it is also possible for other surfaces of the plastics plates 2, 3 to be directly connected to one another additionally or in the alternative and not only those in the top area 10 of the plastics connecting seam 1b.

It is a further advantage of the pleat 9 that the free end of the U-shaped bend 6 has a "direct support surface" in the form of a shoulder of the pleat 9. The mechanical stability of the plastics connecting seam 1b can thus be increased under tension, in particular in response to a load.

A further advantage of the pleat 9 is production-related. This is so, because the pleat 9 makes it possible for an "excessive length", which might be present, of the hook-like fold area 5 of the right plastics plate 3 to be capable of being "accommodated" by the pleat 9 in an advantageous manner. It is thus possible, for example, to trim the two fold areas 7, 5 of the two plastics plates 2, 3 by means of a uniform cutting tool and to nonetheless realize a self-locking connecting seam 1b in a simple manner. This will be explained in more detail in the description below and with reference to FIGS. 4b-4g.

Figure 1C:
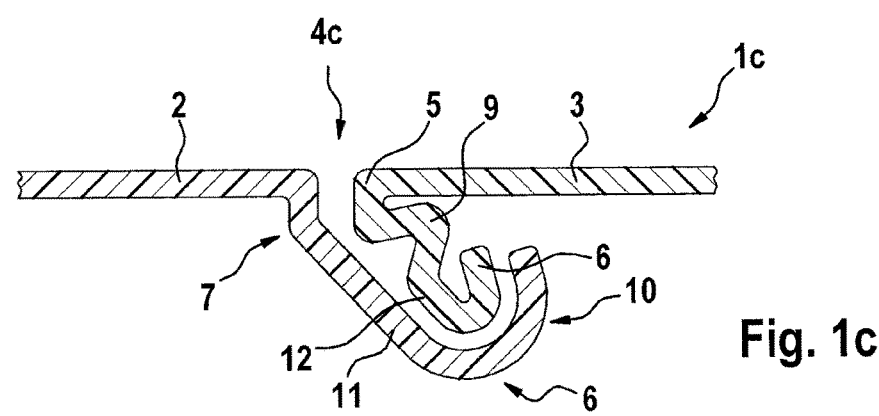

FIG. 1c illustrates a further modification of a plastics connecting seam 1c including a seam area 4c. In a further development of the plastics connecting seams 1a, 1b illustrated in FIGS. 1a and 1b, provision is made for a U-shaped bend 6 in the case of the connecting seam 1c illustrated in FIG. 1c in the top area 10 of the connecting seam 1c not only in the case of the left plate 2, but also in the case of the right plate 3. The two U-shaped bends 6 are thereby formed so as to be complementary to one another with regard to shape. A large advantage in the case of such an embodiment of the plastics connecting seam 1c is that a large, flat contact between the two surfaces of the plastics plates 2, 3 is present in the top area 10. Generally, the tightness of the connecting seam 1c can be increased through this, but also the (mechanical) strength of the plastics connecting seam 1c, if applicable. Due to the fact that the U-shaped bending area of the right plastics plate 3 accommodates a certain length of the fold area 5, the pleat 9 is generally smaller than is the case in the case of the plastics connecting seam 1b shown in FIG. 1b.

Figure 1D:
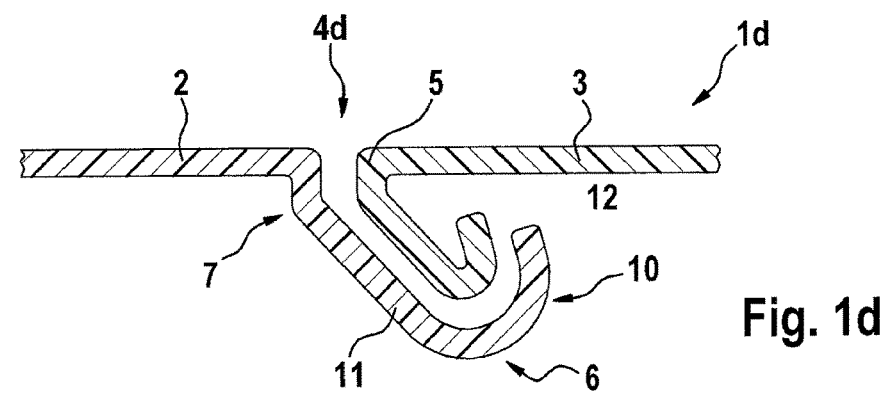

Depending on the dimensions at hand, it is incidentally also possible for the pleat 9 to be foregone completely, so that the exemplary embodiment of a plastics connecting seam 1d including a seam area 4d as shown in FIG. 1d can result.

Figure 1E:
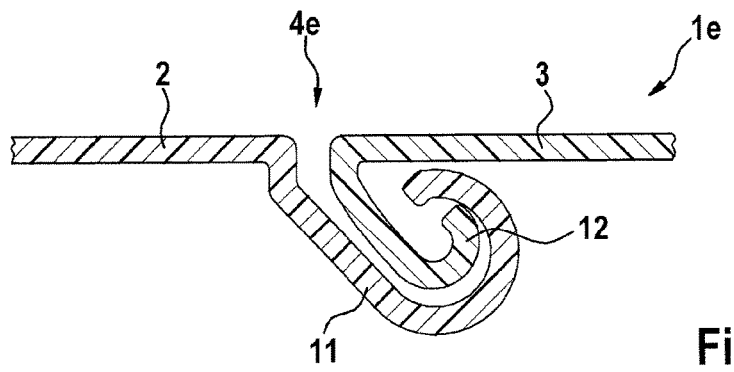

A further advantageous embodiment of a plastics connecting seam 1e can result, if the two tab areas 11, 12 are rotated even further relative to one another, so as to result in a type of roll-up (FIG. 1e). On the one hand, the surface contact area of the two plastics plates 2, 3 can be increased in the seam area 4e through this, which can result in corresponding advantages with regard to the (mechanical) strength as well as the tightness of the plastics connecting seam 1e. However, it is also a further advantage that a further mechanical stabilization can also result with regard to differently oriented forces, which act on the plastics connecting seam 1e. In particular, the plastics connecting seam illustrated in FIG. 1e is also comparatively insensitive to shear forces. Generally, this is correspondingly advantageous.

Figure 1F:
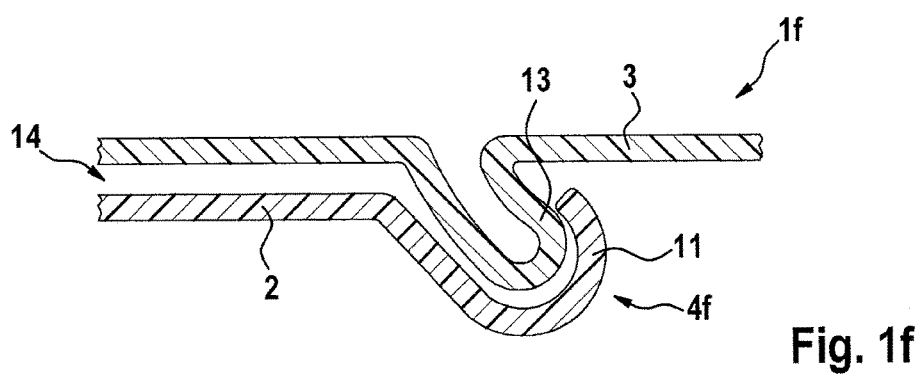

A further example of a plastics connecting seam 1f is illustrated in FIG. 1f. In the case of this, the "right" plastics plate 3 is embodied so as to be continuous, whereas the "left" plastics plate 2 ends in the seam area 4f. As can be gathered from FIG. 1f, a nose-like protrusion 13 is embodied by a deformation of the plastics plate 3 in the seam area 4f in the case of the "right" plastics plate 3 (which is embodied so as to be continuous). This nose-like deformation 13 serves as "holding point" for the tab area 11 of the left plastics plate 2. For example, a particularly long sealing length can be realized in this manner (wherein, for example, the double layer 14 of both plastics plates 2, can be connected by means of welding processes (for example friction welding), preheated dies or the like). The two-layer area 14 can thereby have a substantially arbitrary length and can be in the range of 1 cm or even larger, for example. It is a further advantage of the two-layer area 14 that the mechanical stability of the respective area can be increased once again through this, which can represent a further advantage, in particular for a handle area. The actual seam area 4f can also be displaced out of an "area, which is uncomfortable" for a user, so that a carrying of the resulting plastics bottle can be designed so as to be more comfortable.

Figure 1G:
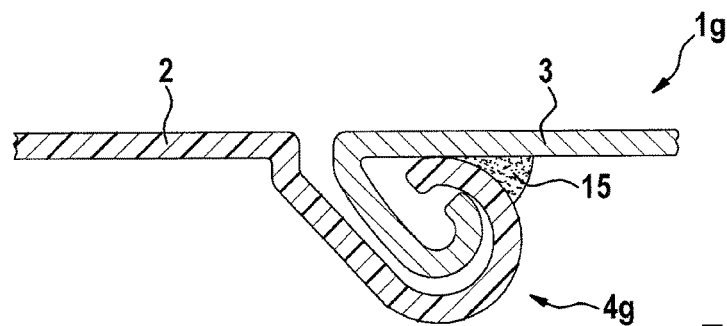

FIG. 1g shows a further modification of a plastics connecting seam 1g. In the exemplary embodiment illustrated herein, the seam area 4g is designed substantially identical to the seam area 4f of the plastics connecting seam 1e illustrated in FIG. 1e. In contrast thereto, however, an additional adhesive 15 is applied laterally in an area of the seam area 4g. This adhesive 15 can be a quick-hardening adhesive, for example, and/or an adhesive 15, which can be hardened by active connection, which hardens under the impact of an external "impulse". One example for this is a UV-hardenable adhesive. The latter can be hardened, for example, (initiated) by a UV lamp (exposure time of 1 s, for example, in response to a corresponding intensity of the lamp) or also under the influence of a UV flashlight. It goes without saying that it is possible to also provide the adhesive 15 in combination with all of the other illustrated modifications (as well as of further modifications, which are not illustrated explicitly herein) of plastics connecting seams.

Figure 1H:
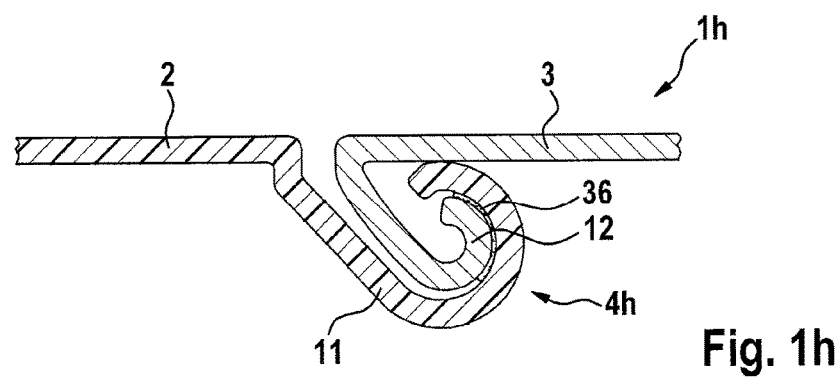

FIG. 1h illustrates a further modification of a plastics connecting seam 1h. Similar to the exemplary embodiment illustrated in FIG. 1g, an adhesive material is also used here for realizing an additional tightness and strength of the connecting seam 1h. However, the adhesive is provided in the form of an adhesive layer 36, which was already applied prior to embodying the actual seam area 4h in the area of the tab 11 of the left plastics plate 2. After embodying the seam area 4h, the corresponding areas of the two plastics plates 2, 3 rest on top of one another by using the adhesive layer 36 as "intermediate layer". By inserting an external "impulse" (for example analogous to the exemplary embodiment according to FIG. 1h by means of UV light; however, other energy inputs, such as, for example, a heat input, in particular by means of an IR lamp, are also possible), the adhesive layer 36 is "activated" and is preferably hardened (substantially) simultaneously.

FIGS. 2a-2f illustrate a method, which is known per se, for producing a PET bottle 16 with handle recess 17. This method is described in EP 2 103 413 B1, for example. The handle recess 17 of the PET bottle 16 is a non-continuous handle recess 17, that is, the bottle wall 19 is continuous in the area of the handle recess 17, so that a two-layer wall 18 results in the area of the handle recess 17. The PET bottle 16, which is illustrated all the way on the right in FIGS. 2a-2f, is a suitable "start bottle" for embodying a real, continuous handle recess in a way, as it will be explained in more detail below.

However, it is also pointed out that it goes without saying that other PET bottles (also bottles of a different plastics material) can serve as starting point for embodying a handle recess. Likewise, it is possible for the PET bottle 16 illustrated in FIGS. 2a-2f to be made in some other way.

In FIGS. 2a-2f, the PET bottle 16 is made of a standard PET blank 20 by means of a stretch blow molding process in the form of a plurality of method steps, which are illustrated schematically in FIGS. 2a-2f. FIGS. 2a-2f thereby illustrates successive production steps (along the axis of time t). The last two partial figures FIG. 2e and FIG. 2f are furthermore provided with a cross sectional illustration in the area of the handle recess 17. The PET blank 20 is a common, commercially available, substantially rotationally symmetrical PET blank. The latter also in particular does not have any "preparatory measures" for embodying a handle recess, such as, for example, an integrally molded plastics protrusion and/or a plastics thickening in only a partial area of the peripheral wall.

The PET blank 20 is initially preheated to a thermoplastic temperature (in the case of PET typically in the range of 95°, which is a few degrees Celsius above the glass transition temperature) and is initially stretched by means of a stretching pin 21, which is inserted into the screw cap opening 22 of the PET blank 20 (and later plastics bottle 16). Compressed air is subsequently blown into the PET blank (FIG. 2c)—also via the screw cap opening 22—so that said PET blank inflates. This inflation is carried out in a blow mold 24, so that the plastics walls 19 are pushed against the walls of the blow mold 24 and thus resulting in the bottle shape of the PET bottle 16, which is to be made.

In the exemplary embodiment illustrated herein, the handle recess 17 is initially prepared by embodying "fish eyes" 23, which protrude outwards from the bottle body. A pre-expansion (and corresponding thinning of the plastics wall 19 in this area) is attained through this. From a production aspect, this can be realized by means of movable dies (see also EP 2 103 413 B1, which has already been mentioned). Hereafter, the dies, which are still retracted in method steps 2*d* and 2*e*, are moved towards one another, so that the handle recess 17 is now formed. The (preheated) dies are moreover pressed against one another with a certain force, so that the two plastics walls 19 of the two-layer wall 18 are connected to one another accordingly in a firmly bonded manner.

FIGS. 3*a*-3*c*, 3*e*-3*g* and 4*b*-4*g* illustrate a possible method as well as an exemplary embodiment for a tool for carrying out the method, in the form of a plurality of successively occurring situations. FIGS. 4*b*-4*g* thereby illustrates a cross sectional view of the seam area 4 (which is to be formed) of a plastics connecting seam 1 in different method steps in a schematic cross section. The area illustrated in FIGS. 4*b*-4*g* corresponds to a partial area of a handle recess 17 in the same manner, as it can be seen in FIG. 2*f*, for example. Parts of the tools, which serve to make the PET bottle "which is still in production", can furthermore be seen in FIGS. 4*b*-4*g* in a schematic cross section. FIGS. 3*a*-3*c*, 3*e*-3*g* thereby shows the respective production phases.

A center line 32 is also delineated in FIGS. 3*a*-3*c*, 3*e*-3*g* as well as in FIG. 4*b*-4*g*. The resulting plastics bottle 16 is approximately mirror symmetrical along this plane.

Figure 3A:
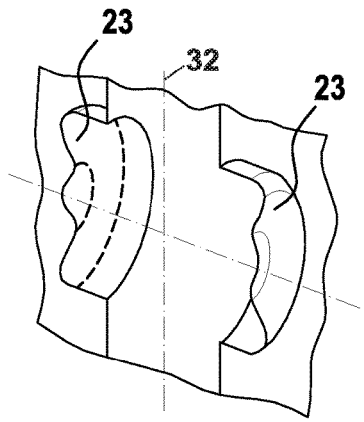
FIGS. 3a-3c, 3e-3g show a method for embodying a handle opening in the case of a PET bottle, visualized by successive, schematic, perspective cross sectional views of the handle area of a PET bottle.
Figure 4B:
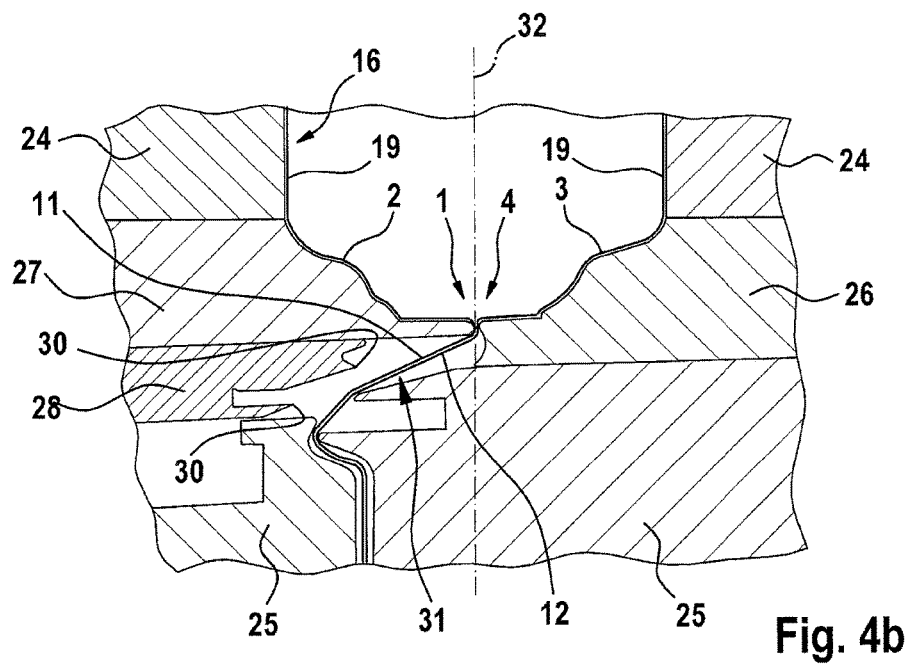
FIGS. 4b-4g show the method as well as a tool, which is suitable for carrying out the method, for embodying self-strengthening plastics seams, visualized by successive, schematic cross sectional illustrations of the seam area of a plastics bottle.

The "fish eye configuration", as it can also be seen in FIGS. 2*d* and 2*e*, is chosen in FIGS. 3*a* and 4*b* as starting point for embodying the handle, which is provided with a continuous opening. As already mentioned, it goes without saying that a different starting configuration can also be chosen. If necessary, certain adaptations of the process flow and/or of the tool need to be carried out in such a case.

The plastics walls 19 of the bottles, which are to be made, can be seen in FIGS. 3*a* and 4*b* in the area of the handle recess 17. The blow mold base body 24 defines the (substantial) shape of the PET bottle. The recess die 25, the anvil die 26, the pressure die 27 as well as the combined rolling/cutting die 28 are located in an outer position, so that a corresponding cavity is defined, into which the fish eyes 23 push.

Figure 3B:
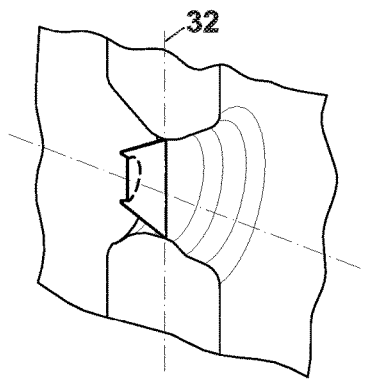

In the next step, the recess dies 25 as well as the anvil die 26 are moved towards one another with the corresponding pressure die 27. The wall areas 19 of the two fish eyes 23 are moved towards one another hereby, so that they finally come to rest on one another (FIGS. 3*b* and 4*b*). The two-layer area of the two plastics webs, however, does not run in a straight line (as it is the case in the case of the two-layer wall area 18 in FIG. 2*f*). Instead, the closing movement of the two recess dies 25 on the one hand and of anvil die 26 and pressure die 27 on the other hand takes place so as to be offset to one another in such a way that an "inclined", two-layer area 31 results in the area of the rolling/cutting die 28. This is useful for obtaining tabs 11, 12 (see FIGS. 1*a*-1*h*) of a suitable length, which will be explained in more detail below.

Figure 3C:
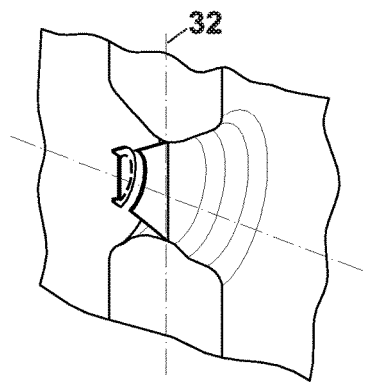
Figure 3E:
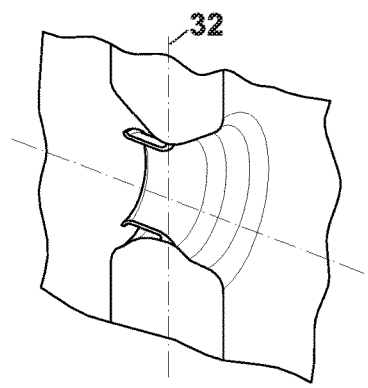
Figure 3F:
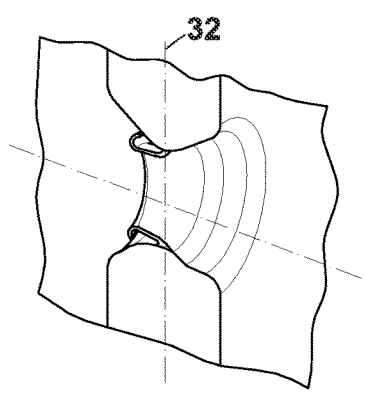
Figure 3G:
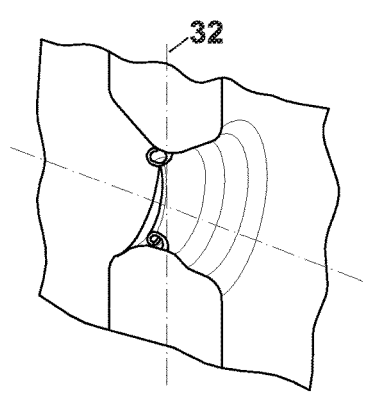
Figure 4C:
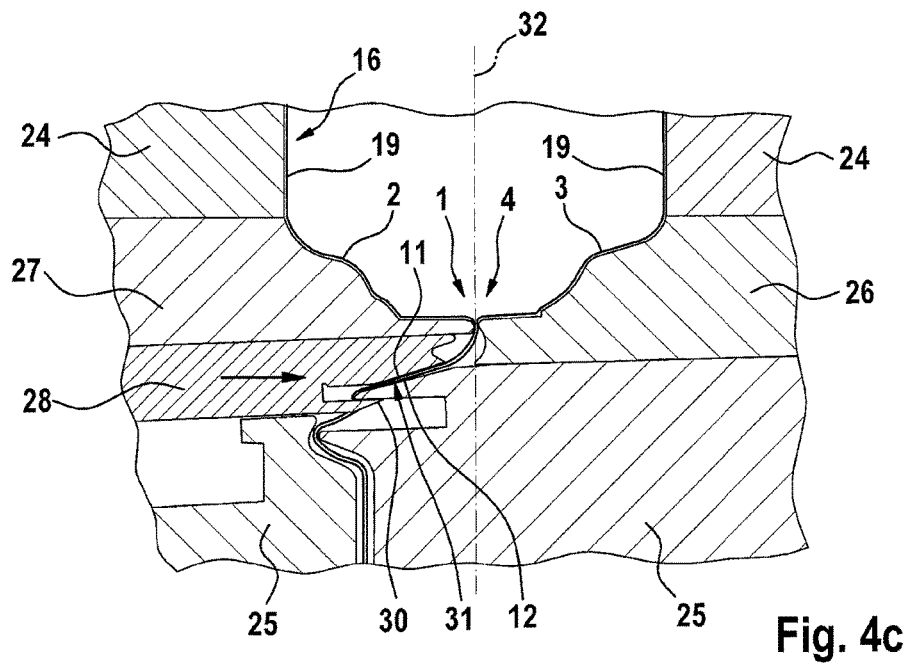
Figure 4D:
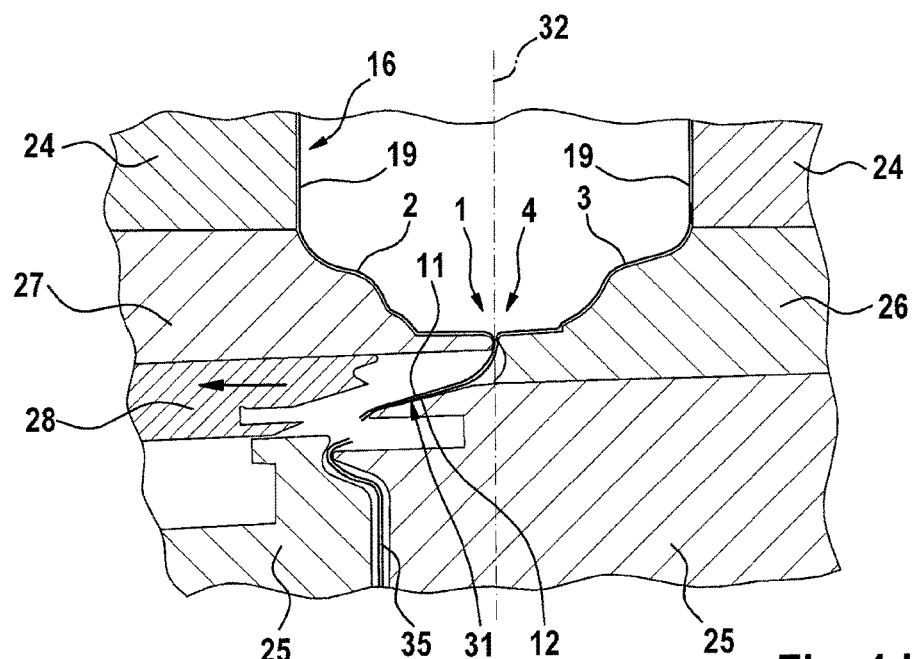

In the next method step according to FIGS. 3*c* and 4*c*, the rolling/cutting die 28 is pushed forwards. As a result of this, the blade 30 severs the two-layer wall 31 along the blade edge. Tabs 11, 12 of a suitable length are formed through this in the seam area 4 of the plastics connecting seam 1. Moreover, the two tabs 11, 12 are pressed on top of one another, thus resulting in a first, deep, firmly bonded connection of the two wall areas 19 of the plastics bottle 16 in this area. To attain a sufficient (fluid) tightness between the two tabs 11, 12, the molding tool preferably rests in the position shown in FIGS. 3*c* and 4*c* for a certain period of time.

Figure 4E:
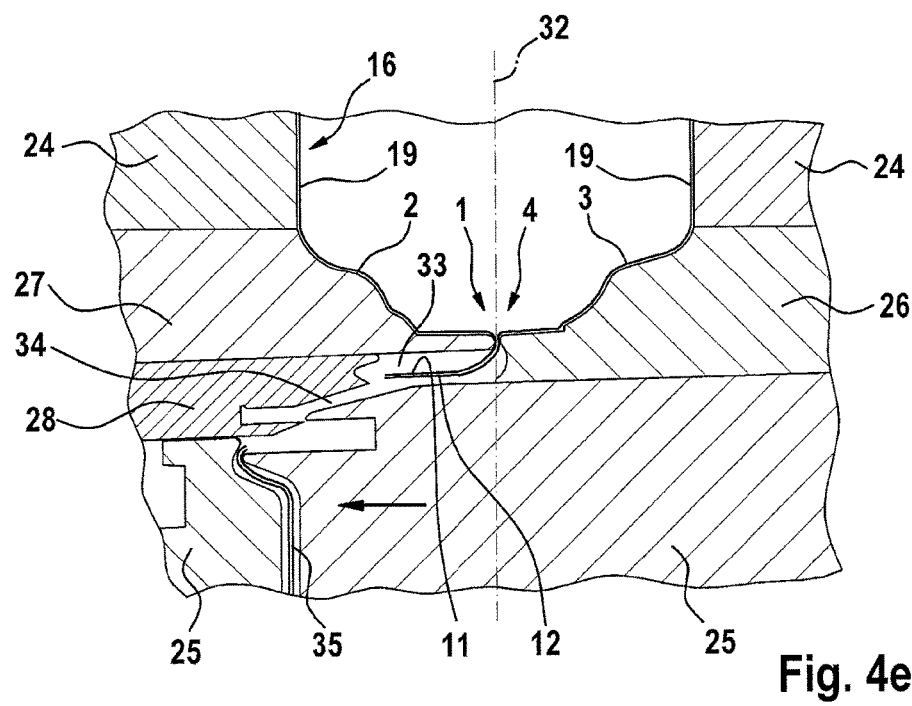
Figure 4F:
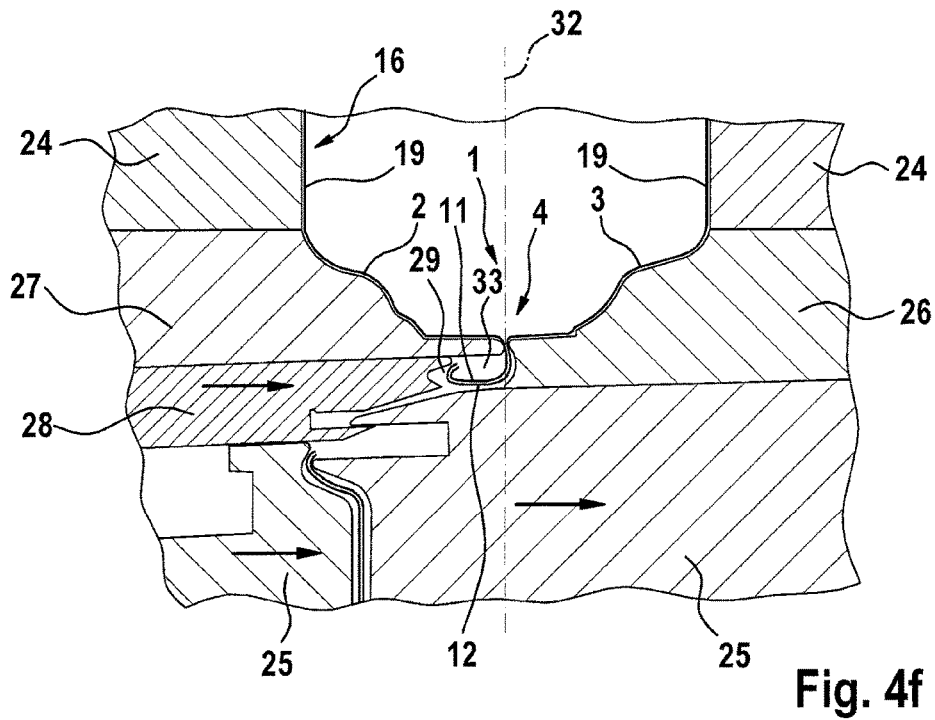
Figure 4G:
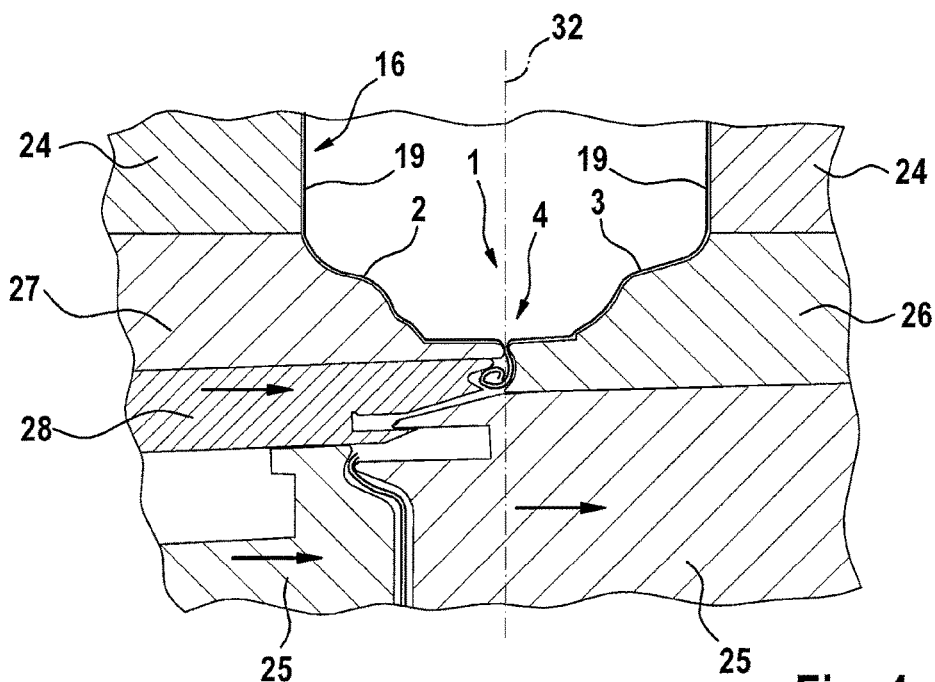

The combined rolling/cutting die 28 is subsequently (FIG. 4*d*) retracted again. The arrangement, which is already known from FIGS. 3*b* and 4*b*, results, wherein the two-layer wall area 31, however, is no longer continuous, but a two-walled area 31 of two tabs 11, 12, which are connected to one another, is now present, as well as a wall piece 35, which is severed therefrom and which is positioned so as to be clamped between the two recess dies 25. The wall piece 35 is waste and can be recycled, for example by fusing, for example so as to be used in response to the production of new PET blanks. In the next step, the two recess dies 25 are now displaced in arrow direction (left in FIG. 4*e*) as unit as compared to the blow mold base body 24 in the direction of the rolling/cutting die 28. As a result of the design of the different dies, this thus results in a chamber 33, which is "formed in an oval-like manner" and in which the two tabs 11, 12, which are connected to one another, are accommodated completely. The gap 34, which remains between rolling/cutting die 28 and the (right) recess die 25, is illustrated in FIG. 4*e* with an exaggerated size. Typically, the gap 34 is substantially closed (contact of the two surfaces of the dies 25, 28, which face one another), or is at least so thin that the tabs 11, 12 cannot advance into said gap.

In the net production step (FIGS. 3*f* and 4*f*), the two recess dies as well as the rolling/cutting die 28 are moved to the right as a unit (towards the anvil die 26). The chamber 33, in which the two tabs 11, 12 are located, is shortened through this. As a result of the design of the roll area 29 of the rolling/cutting die 28, the ends of the tabs 11, 12 are bent over and are further "rolled up" as a result of the continued movement of the respective dies 25, 28. Finally, the position illustrated in FIGS. 3*g* and 4*g* results, in which the plastics connecting seam 1 is formed as being finished (in the exemplary embodiment illustrated herein, this corresponds substantially to the exemplary embodiment of a plastics connecting seam 1*e* illustrated in FIG. 1*e*). However, deviations from this are possible without any problems.

Finally, the entire mold is opened (blow mold base body 24, recess die 25, anvil die 26, pressure die 27, rolling/cutting die 28) and the finished PET bottle 16 is ejected.

However, it is also possible to also apply a UV-hardenable adhesive 15, for example, in the area of the plastics connecting seam 1 on one side, so as to thus realize an increased fluid-tightness of the plastics connecting seam 1 (see exemplary embodiment according to FIG. 1*g*). The application of the UV-hardenable adhesive (or other adhesive) preferably occurs in such a way that the plastics bottle 16 is still positioned so as to be clamped in the mold (for example by retracting pressure die 27, rolling/cutting die 28 and, if applicable, also left recess die 25 and/or right recess die 25). The adhesive, which is to be applied, can be applied in a simpler way through this. Said adhesive can subsequently be hardened (sufficiently) by means of exposure to UV light (for example UV flashlight) within a short period of time.

The PET bottle 16 is subsequently ejected from the tool and can be filled (after a certain waiting period, if applicable).

The invention claimed is:

1. A vessel device being formed as a plastics mold, which is at least partially blow molded;
   the plastics mold comprising at least two plastics workpiece areas which are formed in a flat manner in at least one area of each respective plastics workpiece;
   the plastics mold further comprising at least one plastics connecting seam for a fluid-tight connection of the at least two plastics workpiece areas,
   the plastics mold further comprising at least one aperture, wherein the at least two plastics workpiece areas are configured to define a periphery of the aperture so that the at least one plastics connecting seam extends along the periphery of the aperture, and wherein one of the at least two plastics workpiece areas includes a hook-like fold and the other one of the at least two plastics workpiece areas includes an end area having a rolled-up profile, the end area being rolled up so that the end area is configured to encompass and engage behind the hook-like fold, wherein the engaging behind occurs across an angle of more than 180°, thus enabling the hook-like fold and the end area to provide the at least one plastics connecting seam in such a manner that the hook-like fold and the end area are configured to support the connection strength of the connecting seam at least in response to a tensile load being configured to pull the at least two plastics workpiece areas apart.

2. The vessel device according to claim 1, wherein the plastics mold is made of an injection molded and/or extruded blank.

3. The vessel device according to claim 1, wherein the at least one aperture serves for embodying a handle device.

4. The vessel device according to claim 3, wherein the handle device is configured to be hollow.

5. The vessel device according to claim 1, being configured as a bottle device and/or a canister device.

6. The vessel device according to claim 1, wherein the hook-like fold and the end area are configured so that the tensile load is applicable in a plurality of predefined load directions and the connection strength of the connecting seam is supported by the hook-like fold and the end area in response to the tensile load with respect to each one of the predefined load directions.

7. The vessel device according to claim 1, wherein the at least two plastics workpiece areas are arranged at the at least one plastics connecting seam so that surface areas of the at least two plastics workpiece areas being located on top of each other at the at least one plastics connecting seam are surface-pressed to one another for providing liquid tightness, fluid tightness or gas tightness.

8. The vessel device according to claim 7, wherein the at least one plastics connecting seam is provided with at least one additional fluid sealing device for sealing the at least two plastics workpiece areas with respect to each other at least in sections of the at least one plastics connecting seam.

9. The vessel device according to claim 1, wherein the at least one plastics connecting seam is provided with at least one additional fluid sealing device for sealing the at least two plastics workpiece areas with respect to each other at least in sections of the at least one plastics connecting seam.

10. The vessel device according to claim 9, wherein the additional fluid sealing device is provided as at least one of:
   a seam connecting the at least two plastics workpiece areas in a firmly bonded manner,
   a weld seam,
   an adhesive seam, and
   a seam connecting the at least two plastics workpiece areas by an adhesive that is configured to be hardened under an impact of light.

11. The vessel device according to claim 9, wherein the at least one additional fluid sealing device is arranged asymmetrically, intermediately and/or on an edge side.

12. The vessel device according to claim 1, wherein at least one of the plastics workpiece areas has a plastics material with a short crystallization half life and/or a PET material or is substantially made of such a plastics material, respectively.

* * * * *